(12) United States Patent
Lai

(10) Patent No.: US 7,852,204 B2
(45) Date of Patent: Dec. 14, 2010

(54) SOLAR POWERED THIRD BRAKE LIGHT

(76) Inventor: Ching Tsung Lai, No. 9, Alley 11, Lane 925, Zihcian Rd, Yongkang City, Tainan Hsien (TW) 710

( * ) Notice: Subject to any disclaimer, the term of this patent is extended or adjusted under 35 U.S.C. 154(b) by 298 days.

(21) Appl. No.: 12/029,706

(22) Filed: Feb. 12, 2008

(65) Prior Publication Data
US 2009/0195378 A1 Aug. 6, 2009

Related U.S. Application Data

(60) Provisional application No. 61/024,919, filed on Jan. 31, 2008.

(51) Int. Cl.
*B60Q 1/34* (2006.01)
(52) U.S. Cl. .................. 340/475; 340/453; 340/479; 340/455; 362/473
(58) Field of Classification Search ............. 340/475, 340/453, 479, 455; 362/473
See application file for complete search history.

(56) References Cited

U.S. PATENT DOCUMENTS

| | | | |
|---|---|---|---|
| 6,406,168 B1 * | 6/2002 | Whiting | 362/473 |
| 6,677,856 B2 * | 1/2004 | Perlman et al. | 340/468 |
| 7,218,214 B2 * | 5/2007 | Werner et al. | 340/468 |
| 7,642,743 B1 * | 1/2010 | Nolan et al. | 320/107 |
| 2009/0195378 A1 * | 8/2009 | Lai | 340/475 |

\* cited by examiner

*Primary Examiner*—George A Bugg
*Assistant Examiner*—Bradley E Thompson
(74) *Attorney, Agent, or Firm*—Alexander Chen, Esq.

(57) ABSTRACT

An apparatus is disclosed where a third brake light assembly contains solar cell panel and battery where the solar cell panel charges the battery, driving light and brake light wherein the driving light draws electricity from the battery, a radio frequency receiver that activates the driving light; a radio frequency transmitter that is coupled to a vehicle driving light switch, where the radio frequency transmitter receives instruction from the driving light switch and transmits instruction to the radio frequency receiver. Likewise, a method to add driving light to a vehicle's third brake light assembly is disclosed which includes providing solar cell panel, battery, and driving light where the solar cell panel charges the battery and the battery supplies power to the driving light, and providing radio frequency transmitter that is coupled to a vehicle driving light switch and it receives instruction from the driving light switch and transmits instruction to the radio frequency receiver.

10 Claims, 7 Drawing Sheets

SOLAR POWERED THIRD BRAKE LIGHT

CROSS REFERENCE TO RELATED APPLICATION

This application claims the benefit of priority under 35 U.S.C. 119(e) to the filing date of U.S. provisional patent application No. 61/024,919 entitled "Solar Powered Third Brake light" which was filed Jan. 31, 2008, and is incorporated herein by reference.

FIELD OF THE INVENTION

The present invention relates generally to automobile third brake lights, and more specifically to a solar powered automobile third brake light.

BACKGROUND OF THE INVENTION

Until recent years, third brake lights on motor vehicle have found extensive use, and have been required by law on all new cars operated in many countries, particularly in the United States. The primary purpose of the third brake light is to bring to the attention of the drivers of the following vehicle where the conventional brake lights located at lower bottom on the vehicle may be insufficient of doing so. Thus, the most important objective of a third brake light is to reduce rear end collisions and to improve traffic safety.

Typically, a conventional rear vehicle light contains brake light, signal turning light, and driving light. A typical driving light is turned on at night time for the purpose of illuminating to the following drivers the position of the car. While the driving light as provided by a typical rear vehicle light is sufficient for that purpose, it becomes increasingly obvious that during heavy down fall of snow, rain, and heavy fog that an improved driving light is needed for extra safety.

Because a typical third brake light is installed at least eye-level or higher, an incentive to retrofit a third brake light is provided if the third brake light can also contain driving light to illuminate to the rear following driver. Such combination will benefit users if the product has the attractive features of being versatile, effective, simple, inexpensively easy to install, and straight forward to operate.

The challenge to a simple and easy to install replacement third brake light therefore lies in the ability for an user to utilize existing wiring of third brake light without having to extensively rewire. For example, when retrofitting, a typical third brake light will not contain the necessary wiring for the driving light. Giving the position of the third vehicle light, it is nearly impossible to rewire the wires so an additional set of wire can be available to power the driving light.

Consequently the present invention of solar powered third brake light was conceived to provide the attractive features where the driving light of the third brake light is powered by solar power cell. In this regard, the retrofitting process is greatly simplified as the need of having to rewire the vehicle is eliminated.

OBJECT OF THE INVENTION

It is an object of this invention to provide a third brake light with functional driving light that is solar powered so that the solar powered third brake light is versatile, simple and inexpensive to install.

It is an additional object to provide a third brake light that is easy to install and allows the millions of average users to retrofit their vehicles without having to extensively rewire their vehicles.

It is a further an object to provide a third brake light which contributes and enhances traffic safety.

It is further an object to provide a third brake light which has low manufacturing costs and therefore is inexpensive to purchase.

It is further an object to provide a third brake light that is solar powered where even if weather does not permit the solar cell panel to generate sufficient electricity to power the driving light that the assembly incorporates a charger that is able to provide additional electricity to power the driving light.

SUMMARY OF THE INVENTION

In the present invention, an apparatus is disclosed which includes a third brake light assembly comprising at least one solar cell panel, at least one battery, wherein the solar cell panel supplies electricity to the battery, at least one driving light, at least one brake light, wherein the driving light draws electricity from the battery, and at least one radio frequency receiver, wherein the radio frequency receiver activates the driving light; at least one radio frequency transmitter, wherein the radio frequency transmitter is coupled to a vehicle driving light switch, wherein the radio frequency transmitter receives instruction from the driving light switch and transmits instruction to the radio frequency receiver.

In one embodiment, third brake light assembly further includes a charger, wherein the charger charges the battery by drawing electricity from a vehicle's third brake light wiring.

In yet another embodiment, the third brake light assembly further includes at least one working light.

In yet one other embodiment, the third brake light assembly further includes at least one turn signal light, wherein the turn signal light draws electricity from the battery, wherein the radio frequency transmitter is coupled to a vehicle turn signal light switch, wherein the radio frequency transmitter receives instruction from the turn signal light switch and transmits instruction to the radio frequency receiver, wherein the radio frequency receiver activates the turn signal light.

In yet another prefer embodiment, at least two brake lights are positioned adjacent to the left and the right of the working light and the driving light is positioned above the working lights.

In one other aspect, a method of adding at least one driving light to a vehicle's third brake light assembly is provided where the method includes providing at least one solar cell panel; providing at least one battery, wherein the solar cell panel supplies electricity to the battery; providing at least one driving light, wherein the driving light draws electricity from the battery; providing at least one radio frequency receiver, wherein the radio frequency receiver activates the driving light; providing at least one radio frequency transmitter, wherein the radio frequency transmitter is coupled to a vehicle driving light switch, wherein the radio frequency transmitter receives instruction from the driving light switch and transmits instruction to the radio frequency receiver. In a preferred embodiment, the method further provides a charger, wherein the charger charges the battery by drawing electricity from a vehicle's third brake light wiring.

In yet another embodiment, a method of adding at least one driving light and at least one turn signal light to a vehicle's third brake light assembly is disclosed where the method includes providing at least one solar cell panel; providing at least one battery, wherein the solar cell panel supplies electricity to the battery; providing at least one driving light, wherein the driving light draws electricity from the battery; providing at least one turn signal light, wherein the turn signal light draws electricity from the battery; providing at least one radio frequency receiver, wherein the radio frequency receiver activates the driving light and the turn signal light; providing at least one radio frequency transmitter, wherein the radio frequency transmitter is coupled to a vehicle driving light switch and a vehicle turn signal light switch, wherein the radio frequency transmitter receives instruction from the driving light switch and the turn signal light switch and transmits instruction to the radio frequency receiver.

In yet one other embodiment, the method also provides a charger, wherein the charger charges the battery by drawing electricity from a vehicle's third brake light wiring.

In yet another embodiment, an apparatus is disclosed which comprises a third brake light assembly comprising: at least one solar cell panel, at least one battery, wherein the solar cell panel supplies electricity to the battery, at least one driving light, at least one turn signal light, at least one brake light, wherein the driving light and the turn signal light draw electricity from the battery, and radio frequency receiver one, wherein said radio frequency receiver one activates the driving light; one radio frequency transmitter one, wherein the radio frequency transmitter one is coupled to a vehicle driving light switch, wherein the radio frequency transmitter one receives instruction from said driving light switch and transmits instruction to the radio frequency receiver one, and radio frequency receiver one, wherein the radio frequency receiver one activates said driving light; one radio frequency receiver two, wherein the radio frequency receiver two activates the turn signal light; one radio frequency transmitter two, wherein the radio frequency transmitter two is coupled to a vehicle turn signal switch, wherein the radio frequency transmitter two receives instruction from the turn signal light switch and transmits instruction to the radio frequency receiver two.

In one other embodiment third brake light assembly further includes a charger, wherein the charger charges the battery by drawing electricity from a vehicle's third brake light wiring. In yet another embodiment, the third brake light assembly further includes at least one working light.

In yet one more different embodiment, an apparatus is disclosed which includes a third brake light assembly comprising: at least one solar cell panel, at least one battery, wherein the solar cell panel supplies electricity to the battery, at least one driving light, at least one turn signal light, at least one brake light wherein the driving light and the turn signal light draw electricity from the battery, at least one signal processor and at least one radio frequency receiver, wherein the signal processor receives signal from the radio frequency receiver and activates the driving light and the turn signal light; at least one radio frequency transmitter, wherein the radio frequency transmitter is coupled to the signal processor, wherein the signal processor is coupled to a vehicle driving light switch and a vehicle turn signal switch, wherein the signal processor receives instruction from the driving light switch and the vehicle turn signal switch and transmits instruction to the radio frequency transmitter, wherein the radio frequency transmitter transmits instruction to the radio frequency receiver.

In yet one other embodiment, the apparatus assembly further includes a charger, wherein the charger charges the battery by drawing electricity from a vehicle's third brake light wiring. In yet another embodiment, the apparatus further includes at least one working light.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
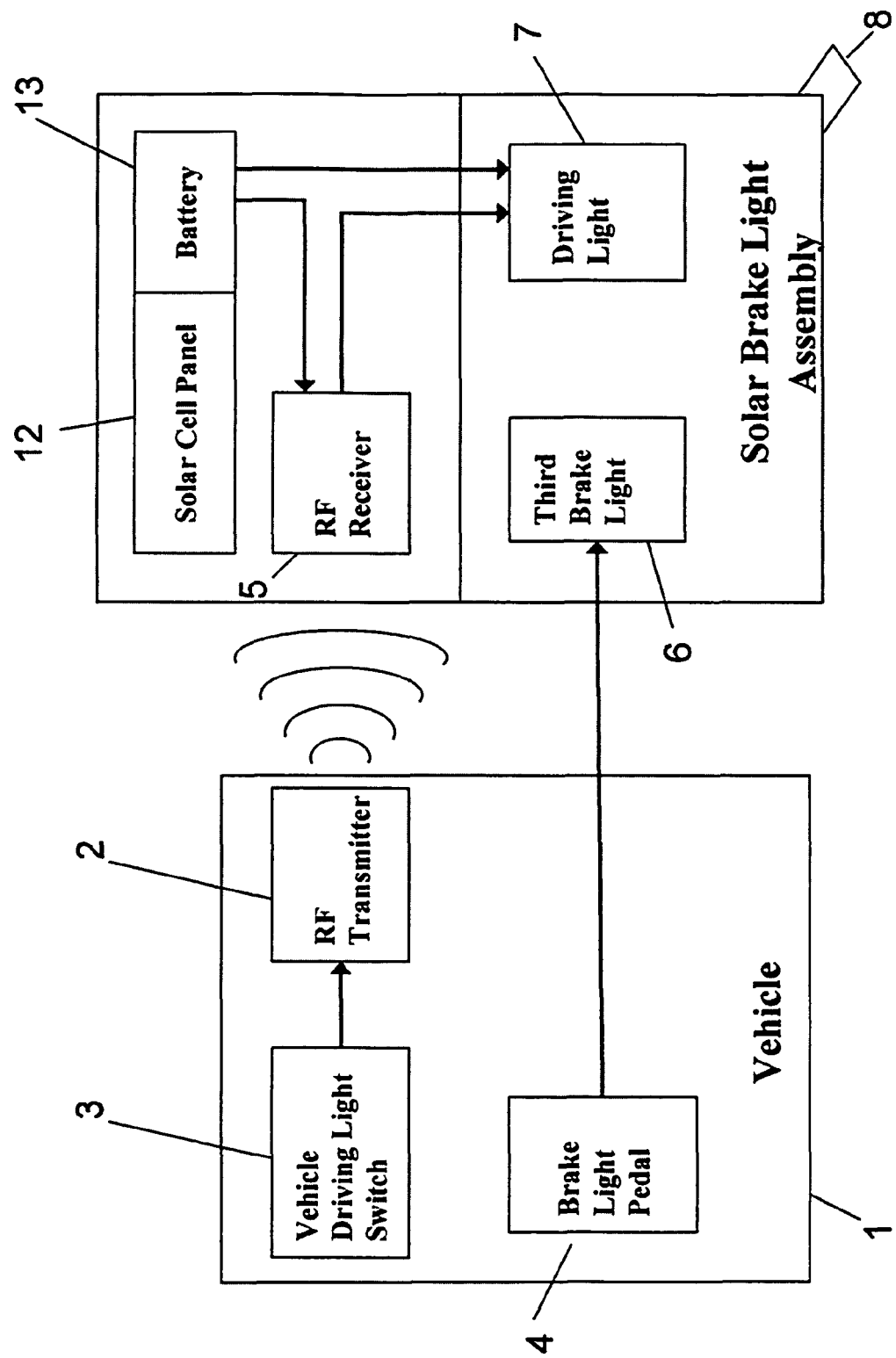
FIG. 1 is a system diagram illustrating the present invention wherein the diagram discloses the apparatus of present invention comprising a solar power third brake light assembly and a radio frequency transmitter.

Reference is now made to FIG. 1, which illustrates an apparatus comprising a solar power third brake light assembly, constructed and operative in accordance with an embodiment of the present invention.

In FIG. 1, the diagram discloses a typical embodiment on the present invention. The apparatus comprises a solar powered third brake light assembly 8 which includes at least one solar cell panel 12 is provided and the solar cell panel 12 is coupled to a battery 13. In this embodiment, the solar cell panel 12 charges the battery 13 by supplying electricity to the battery 13. Disclosed also is a RF (radio frequency) receiver 5. Here the RF receiver 5 draws electricity from the battery 13 and receive signals from the RF (radio frequency) transmitter 2 where the RF transmitter 2 is coupled to the vehicle's driving light switch 3. When the vehicle light switch 3 is turned to On position, the RF transmitter 2 sends radio signals to the RF receiver 5 and the RF receiver 5 then activates the driving light 7. Here, the driving light 7 draws electricity from the battery 13. Also disclosed in the diagram is a brake light pedal 4 and the third brake light 6 where when the brake light pedal is depressed, the third brake light 6 will activate.

In accordance with the objective of the present invention, a user will be able to install the solar brake light assembly 8 by swapping out the original brake light without having to rewire the wires leading to the original third brake light.

Thus, in this typical embodiment, a user purchases the apparatus which includes the solar brake light assembly 8 and a RF transmitter 2. The user couples the RF transmitter 2 to the vehicle's driving light switch 3 and then replaces the original third brake light with the solar brake light assembly 8 of the present invention.

The replacement is easy to be performed and no rewiring of the wires leading to the third brake light is necessary because the solar replacement light continues to utilize the original wiring to power the third brake light 6. The driving light 7 on the solar brake light assembly 8 does not require rewiring and draws power from the battery 13.

Figure 2:
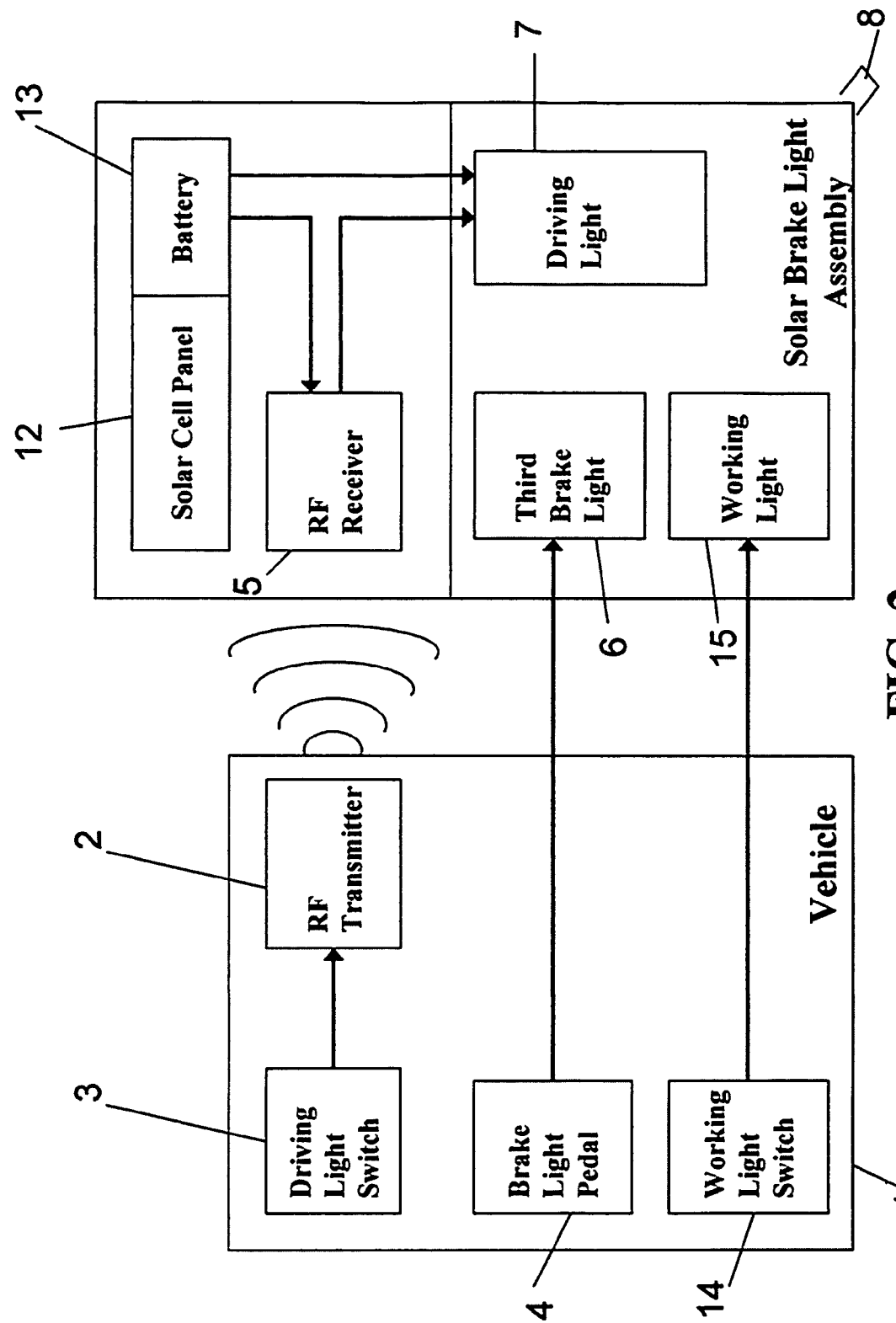
FIG. 2 is a system diagram of FIG. 1 where the solar power third brake light assembly further includes working light.

Now referring to FIG. 2, this diagram essentially discloses the same system as disclosed in FIG. 1 except that the solar brake light assembly 8 now includes a working light 15 where the working light 15 is connected by wire to the working light switch 14. This is a common embodiment with trucks since most trucks are equipped with working light within its original third brake light assembly.

Figure 3:
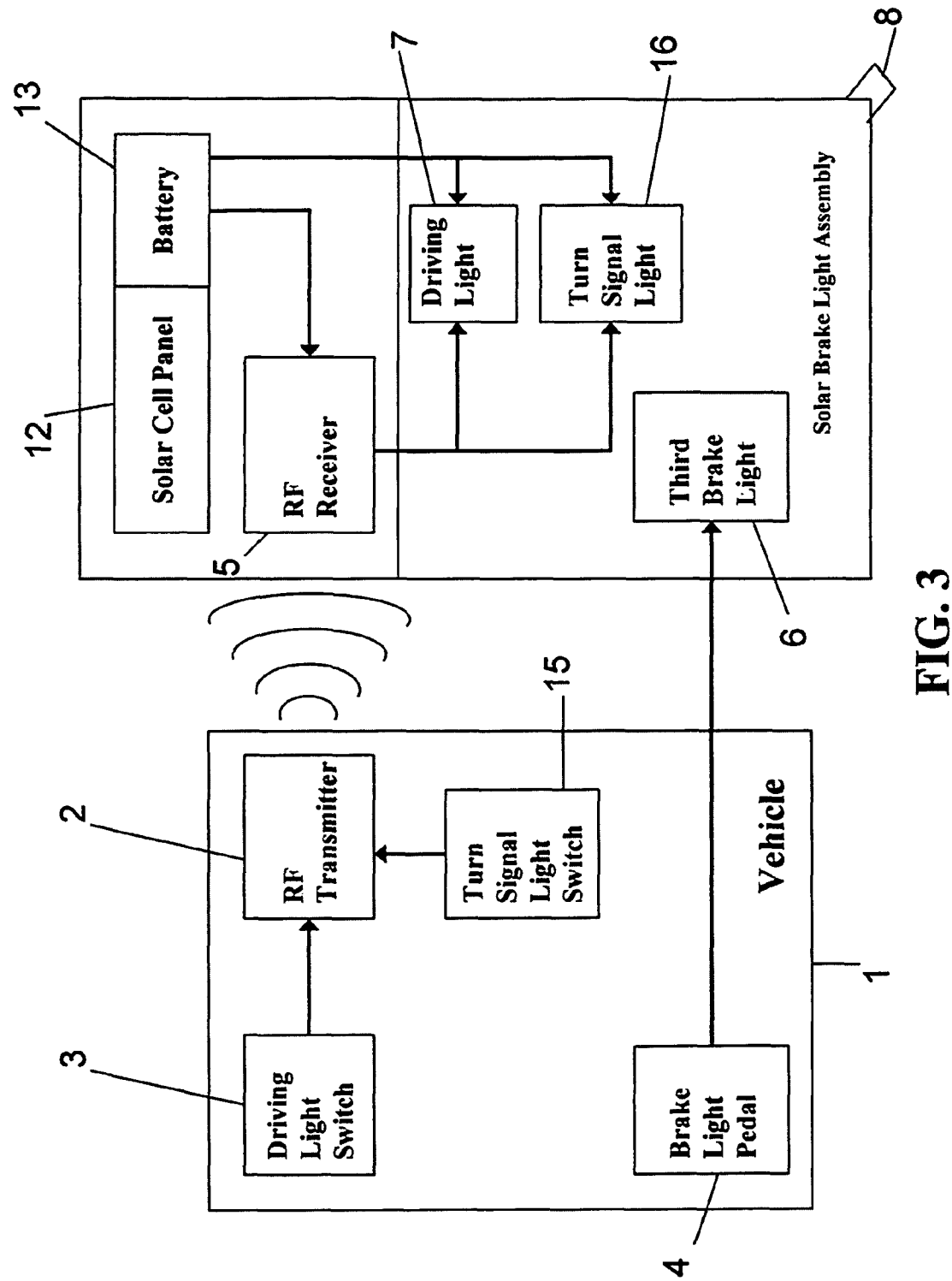
FIG. 3 is a system diagram of FIG. 1 where the solar power third brake light assembly further includes turn signal light.

In FIG. 3, another embodiment is disclosed where the solar brake light assembly 8 incorporates at least one turn signal light 16. Here the turn signal light 16 is power by the battery 13 and is activated by receiving instruction from the RF receiver 5. In this embodiment, the RF receiver 5 receives instruction from the RF transmitter 2 which is coupled to the turn signal switch 15 where each time the turn signal light switch 15 is activated, the RF transmitter 2 sends signals to RF receiver 5.

A user who retro fits his third brake light utilizing this embodiment is able to greatly increase the safety of the vehicle because both the driving light and the turn signal light are positioned at the third brake light and they are able to alert the following traffic not only in marginal visibility weather, but also in regular day to day driving.

Figure 4:
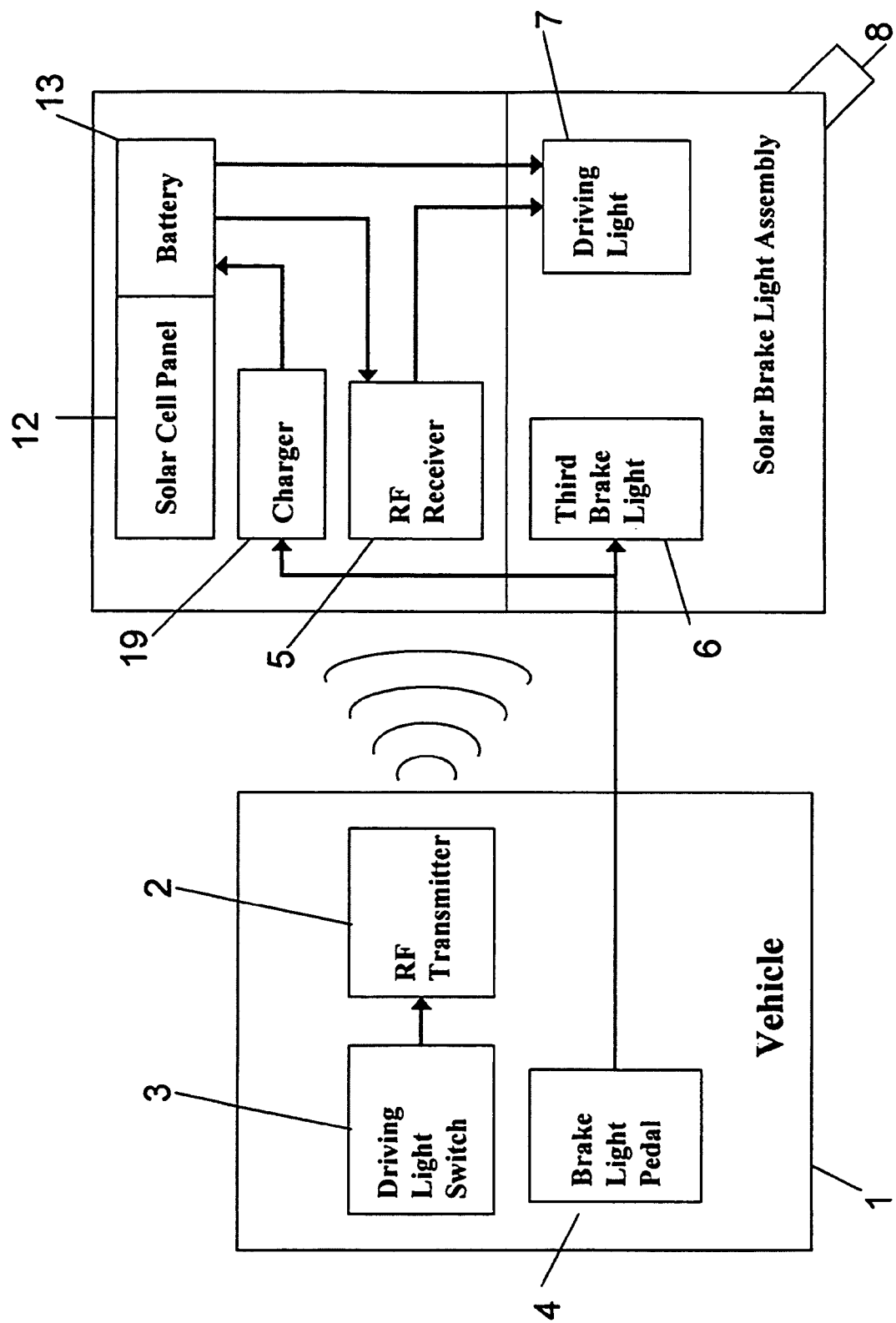
FIG. 4 is a system diagram of FIG. 1 where the solar power third brake light assembly further includes a charger.

In FIG. 4, a preferred embodiment of the present invention is disclosed. In this embodiment, the solar brake light assembly 8 further incorporates a charger 19 coupled to the wiring for the original third brake light. In this embodiment, each time the third brake light pedal 4 is depressed, the electricity flows to the charger 19 and in turns the charger 19 charges the battery 13. The embodiment adds the benefit of charging the battery 13 in the event the solar cell panel 12 may in some instances unable to sufficiently provide electricity to the battery 13.

Figure 5:
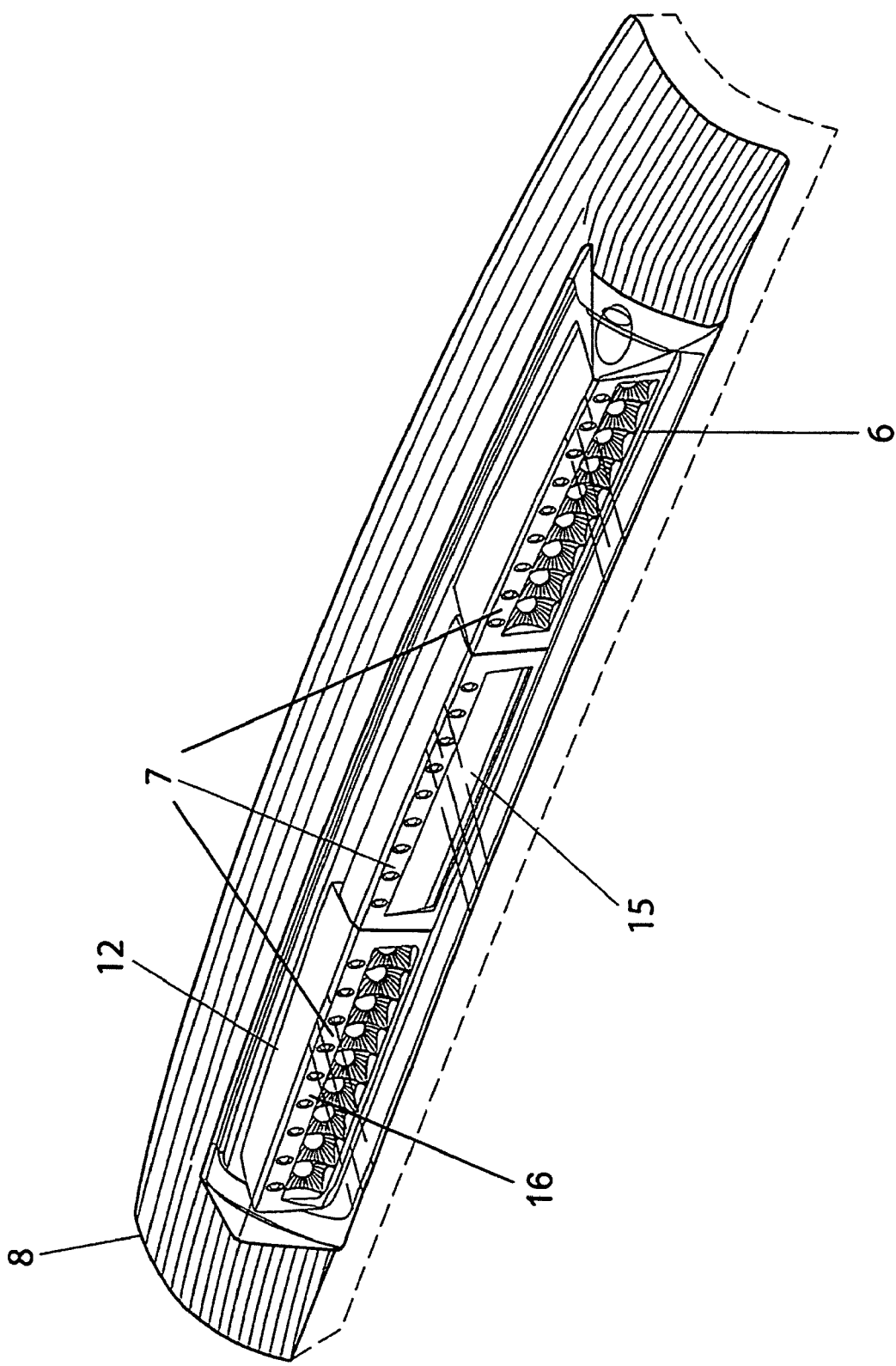
FIG. 5 is a pictorial illustration of a solar powered third brake light, constructed and operative in accordance with an embodiment of the present invention.

In FIG. 5 is a pictorial illustration of a solar powered third brake light, constructed and operative in accordance with an embodiment of the present invention. In this embodiment, the solar brake light assembly 8 incorporates third brake light 6, working light 15, driving light 7, turn signal light 16, and solar cell panel 12 is disclosed.

Figure 6:
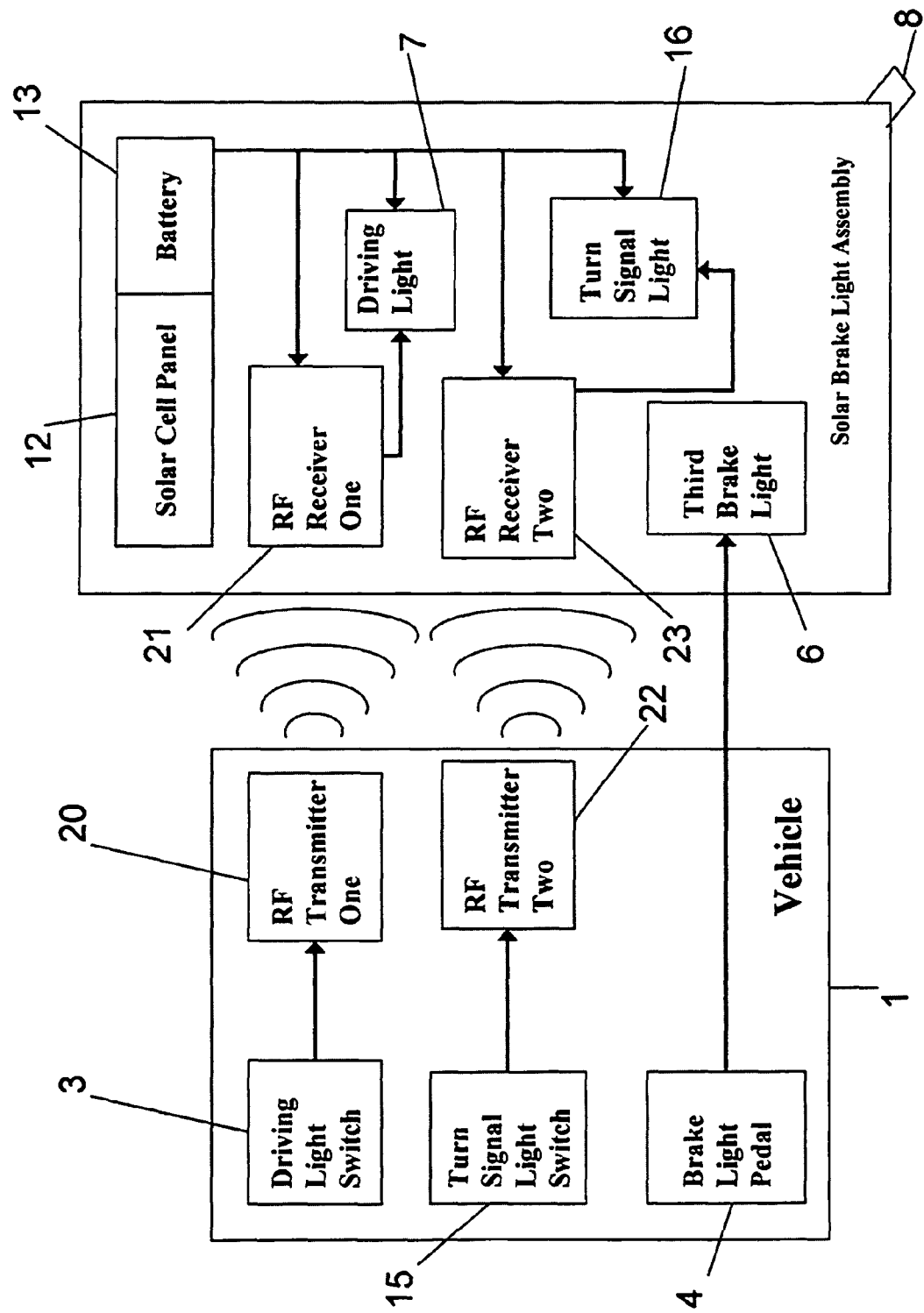
FIG. 6 is a system diagram illustrating the present invention wherein the diagram discloses the apparatus of present invention comprising a solar power third brake light assembly and the user of dual radio frequency transmitters.

In FIG. 6, the diagram discloses a preferred embodiment on the present invention. The apparatus comprises a solar powered third brake light assembly 8 which includes at least one solar cell panel 12 is provided and the solar cell panel 12 is coupled to a battery 13. In this embodiment, the solar cell panel 12 charges the battery 13 by supplying electricity to the battery 13. Disclosed also is a RF (radio frequency) receiver one 21 RF receiver two 23. Here the RF receivers 21 and 23 draw electricity from the battery 13 and receive signals from the RF (radio frequency) transmitter one 20 and transmitter two 22 where the RF transmitter 20 is coupled to the vehicle's driving light switch 3 and transmitter two 22 is coupled to vehicle signal light switch 15. When the vehicle light switch 3 is turned to On position, the RF transmitter one 20 sends radio signals to the RF receiver one 21 and the RF receiver 21 then activates the driving light 7. Here, the driving light 7 draws electricity from the battery 13. When the vehicle turn signal light switch 15 is activated, the RF transmitter two 22 sends radio signals to the RF receiver two 23 and the RF receiver 23 then activates turn signal light 16. Here, the turn signal light 16 draws electricity from the battery 13. Also disclosed in the diagram is a brake light pedal 4 and the third brake light 6 where when the brake light pedal is depressed, the third brake light 6 will activate.

Figure 7:
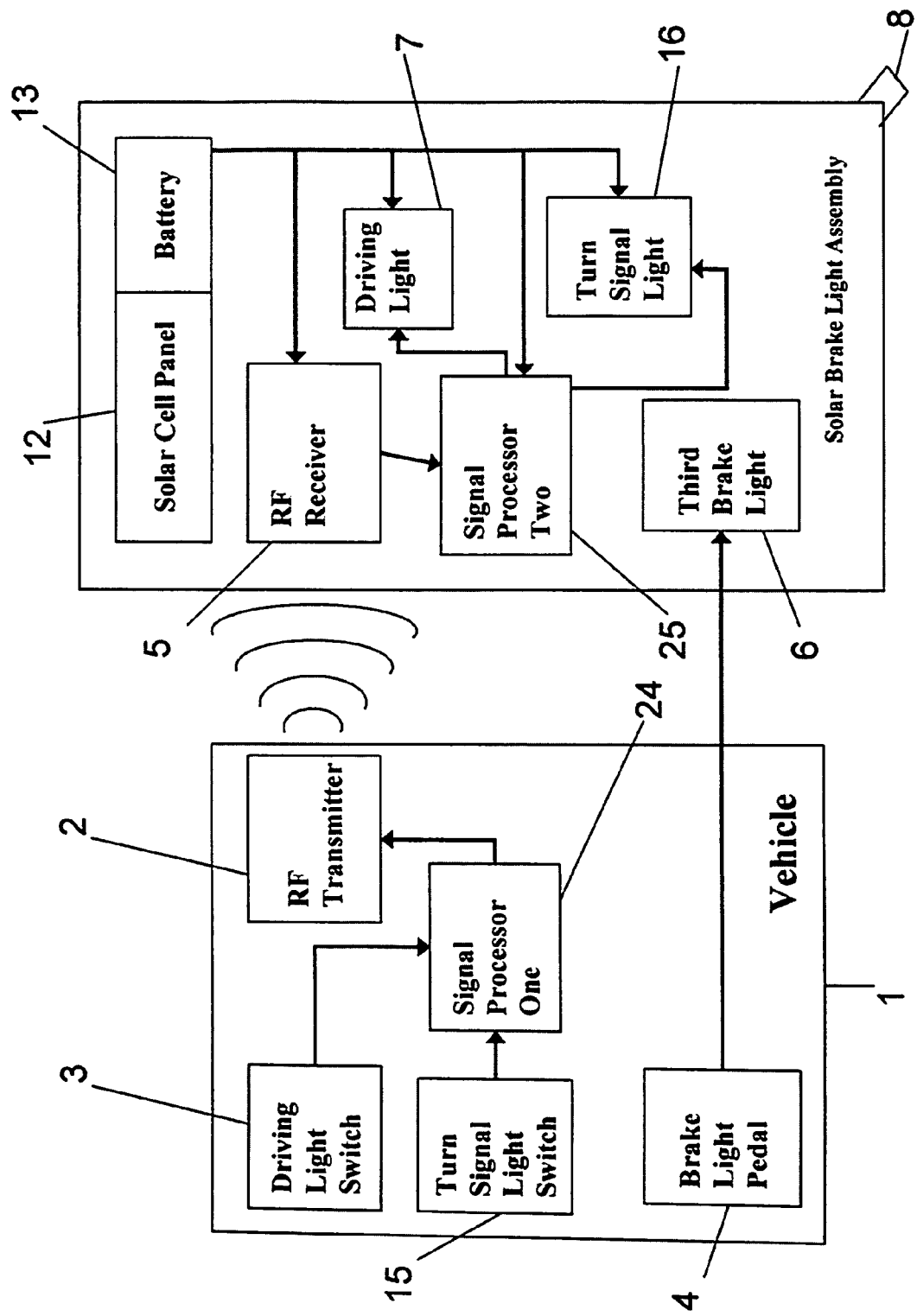
FIG. 7 is a system diagram illustrating the present invention wherein the diagram discloses the apparatus of present invention comprising a solar power third brake light assembly and the user of radio frequency transmitter and signal processors.

In yet another preferred embodiment, FIG. 7 discloses an apparatus comprises a solar powered third brake light assembly 8 which includes at least one solar cell panel 12 is provided and the solar cell panel 12 is coupled to a battery 13. In this embodiment, the solar cell panel 12 charges the battery 13 by supplying electricity to the battery 13. Disclosed also is a RF (radio frequency) receiver 5. Here the RF receivers 5 draws electricity from the battery 13 and receive signals from the RF (radio frequency) transmitter 2 where the RF transmitter 2 is coupled to a signal processor one 24 which is coupled to vehicle's driving light switch 3 and vehicle signal light switch 15. When the vehicle light switch 3 is turned to On position or when the vehicle turn signal light switch 15 is activated, the signal processor one 24 determines whether to signal the driving light or the turn signal light and then the RF transmitter 2 sends radio signals to the RF receiver 5 and transmits to signal processor two 25 where the signal processor two determines to whether activate the driving light 7 or the turn signal light 16. The RF receiver 5, the signal processor two 25, the turn signal light 16 and the driving light 7 are powered by the battery 13. Also disclosed in the diagram is a brake light pedal 4 and the third brake light 6 where when the brake light pedal is depressed, the third brake light 6 will activate.

It is appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. An apparatus comprising, a third brake light assembly comprising: at least one solar cell panel, at least one battery, wherein said solar cell panel supplies electricity to said battery, at least one driving light, at least one brake light, wherein said driving light draws electricity from said battery, and at least one radio frequency receiver, wherein said radio frequency receiver activates said driving light; at least one radio frequency transmitter, wherein said radio frequency transmitter is coupled to a vehicle driving light switch, wherein said radio frequency transmitter receives instruction from said driving light switch and transmits instruction to said radio frequency receiver, a charger, wherein said charger charges the battery by drawing electricity from a vehicle's third brake light wiring when a brake light pedal is depressed.

2. The apparatus according to claim 1, wherein said third brake light assembly further comprises at least one working light.

3. The apparatus according to claim 1, wherein said third brake light assembly further comprises at least one turn signal light, wherein said turn signal light draws electricity from said battery, wherein said radio frequency transmitter is coupled to a vehicle turn signal light switch, wherein said radio frequency transmitter receives instruction from said turn signal light switch and transmits instruction to said radio frequency receiver, wherein said radio frequency receiver activates said turn signal light.

4. The apparatus according to claim 2, wherein at least two brake lights are positioned adjacent to the left and the right of said working light and said driving light is positioned above said working lights.

5. A method of adding at least one driving light to a vehicles third brake light assembly comprising: a providing at least one solar cell panel; b. providing at least one battery, wherein said solar cell panel supplies electricity to said battery; c. providing at least one driving light, wherein said driving light draws electricity from said battery; d. providing at least one radio frequency receiver, wherein said radio frequency receiver activates said driving light; e. providing at least one radio frequency transmitter, wherein said radio frequency transmitter is coupled to a vehicle driving light switch, wherein said radio frequency transmitter receives instruction from said driving light switch and transmits instruction to said radio frequency receiver, a charger, wherein said charger charges the battery by drawing electricity from a vehicle's third brake light wiring when a brake light pedal is depressed.

6. A method of adding at least one driving light and at least one turn signal light to a vehicle's third brake light assembly comprising: a. providing at least one solar cell panel; b. providing at least one battery, wherein said solar cell panel supplies electricity to said battery; c. providing at least one driving light, wherein said driving light draws electricity from said battery; d. providing at least one turn signal light, wherein said turn signal light draws electricity from said battery; e. providing at least one radio frequency receiver, wherein said radio frequency receiver activates said driving light and said turn signal light; f. providing at least one radio frequency transmitter, wherein said radio frequency transmitter is coupled to a vehicle driving light switch and a vehicle turn signal light switch, wherein said radio frequency transmitter receives instruction from said driving light switch and said turn signal light switch and transmits instruction to said radio frequency receiver, a charger, wherein said charger charges the battery by drawing electricity from a vehicles third brake light wiring when a brake light pedal is depressed.

7. An apparatus comprising, a third brake light assembly comprising: at least one solar cell panel, at least one battery, wherein said solar cell panel supplies electricity to said battery, at least one driving light, at least one turn signal light, at least one brake light, wherein said driving light and said turn signal light draw electricity from said battery, and radio frequency receiver one, wherein said radio frequency receiver one activates said driving light; one radio frequency transmitter one, wherein said radio frequency transmitter one is coupled to a vehicle driving light switch, wherein said radio frequency transmitter one receives instruction from said driving light switch and transmits instruction to said radio frequency receiver one, and radio frequency receiver one, wherein said radio frequency receiver one activates said driving light; one radio frequency receiver two, wherein said radio frequency receiver two activates said turn signal light; one radio frequency transmitter two, wherein said radio frequency transmitter two is coupled to a vehicle turn signal switch, wherein said radio frequency transmitter two receives instruction from said turn signal light switch and transmits instruction to said radio frequency receiver two, a charger, wherein said charger charges the battery by drawing electricity from a vehicles third brake light wiring when a brake light pedal is depressed.

8. The apparatus according to claim 7, wherein said third brake light assembly further comprises at least one working light.

9. An apparatus comprising, a third brake light assembly comprising: at least one solar cell panel, at least one battery, wherein said solar cell panel supplies electricity to said battery, at least one driving light, at least one turn signal light, at least one brake light, wherein said driving light and said turn signal light draw electricity from said battery, at least one signal processor and at least one radio frequency receiver, wherein said signal processor receives signal from said radio frequency receiver and activates said driving light and said turn signal light; at least one radio frequency transmitter, wherein said radio frequency transmitter is coupled to said signal processor, wherein said signal processor is coupled to a vehicle driving light switch and a vehicle turn signal switch, wherein said signal processor receives instruction from said driving light switch and said vehicle turn signal switch and transmits instruction to said radio frequency transmitter, wherein said radio frequency transmitter transmits instruction to said radio frequency receiver, a charger, wherein said charger charges the battery by drawing electricity from a vehicle's third brake light wiring when a brake light pedal is depressed.

10. The apparatus according to claim 9, wherein said third brake light assembly further comprises at least one working light.

\* \* \* \* \*